(12) United States Patent
Prakash et al.

(10) Patent No.: US 7,698,044 B2
(45) Date of Patent: Apr. 13, 2010

(54) METHOD AND APPARATUS FOR BRAKING AND STOPPING VEHICLES HAVING AN ELECTRIC DRIVE

(75) Inventors: Raj Prakash, Canton, MI (US); Dale Crombez, Livonia, MI (US); Peter Worrel, Troy, MI (US); Vijay Garg, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 11/699,799

(22) Filed: Jan. 29, 2007

(65) Prior Publication Data

US 2007/0124052 A1 May 31, 2007

Related U.S. Application Data

(62) Division of application No. 10/927,195, filed on Aug. 25, 2004.

(51) Int. Cl.
*G05D 3/12* (2006.01)
(52) U.S. Cl. .................... 701/82; 701/22; 903/947
(58) Field of Classification Search ............ 701/22, 701/82
See application file for complete search history.

(56) References Cited

U.S. PATENT DOCUMENTS

| | | | | |
|---|---|---|---|---|
| 5,125,469 A * | 6/1992 | Scott | ................... | 180/65.2 |
| 5,376,869 A * | 12/1994 | Konrad | ................... | 318/587 |
| 5,450,324 A * | 9/1995 | Cikanek | ................... | 701/108 |
| 5,467,275 A * | 11/1995 | Takamoto et al. | ................ | 701/70 |
| 5,534,764 A * | 7/1996 | Masaki et al. | ................ | 318/802 |
| 5,644,200 A * | 7/1997 | Yang | ................... | 318/139 |
| 5,726,890 A * | 3/1998 | Takamoto et al. | ................ | 701/70 |
| 5,799,262 A * | 8/1998 | Suzuki | ................... | 701/93 |
| 5,884,201 A * | 3/1999 | Kawai | ................... | 701/22 |
| 5,934,395 A * | 8/1999 | Koide et al. | ................ | 180/65.2 |
| 6,061,623 A * | 5/2000 | Hippley et al. | ................ | 701/93 |
| 6,122,588 A * | 9/2000 | Shehan et al. | ................ | 701/93 |
| 6,192,847 B1 * | 2/2001 | Davis | ................... | 123/179.4 |
| 6,193,628 B1 * | 2/2001 | Hrovat et al. | ................ | 477/3 |
| 6,263,267 B1 * | 7/2001 | Anthony et al. | ................ | 701/22 |
| 6,278,915 B1 * | 8/2001 | Deguchi et al. | ................ | 701/22 |
| 6,278,916 B1 * | 8/2001 | Crombez | ................ | 701/22 |
| 6,321,144 B1 * | 11/2001 | Crombez | ................ | 701/22 |
| 6,336,070 B1 * | 1/2002 | Lorenz et al. | ................ | 701/102 |
| 6,411,882 B1 * | 6/2002 | Bidner et al. | ................ | 701/93 |
| 6,427,109 B1 * | 7/2002 | Doering et al. | ................ | 701/54 |
| 6,488,107 B1 * | 12/2002 | Ochiai et al. | ................ | 180/65.2 |
| 6,488,608 B2 * | 12/2002 | Yamaguchi et al. | ............ | 477/3 |
| 6,490,511 B1 * | 12/2002 | Raftari et al. | ................ | 701/22 |
| 6,510,370 B1 * | 1/2003 | Suzuki et al. | ................ | 701/22 |
| 6,519,513 B2 * | 2/2003 | Nakagawa et al. | ............ | 701/22 |
| 6,558,290 B2 * | 5/2003 | Phillips et al. | ................ | 477/5 |
| 6,560,523 B2 * | 5/2003 | Kotwicki et al. | ............... | 701/54 |
| 6,590,299 B2 * | 7/2003 | Kuang et al. | ............... | 290/40 C |

(Continued)

*Primary Examiner*—Eric Bolda
*Assistant Examiner*—Ari M Diacou
(74) *Attorney, Agent, or Firm*—Tung & Associates

(57) ABSTRACT

A method and apparatus are provided for braking and stopping a vehicle whose powertrain includes an electric drive. The electric drive is used to generate braking torque which is used to decelerate the vehicle down to a full stop. The braking torque is achieved using any of several closed loop speed control systems. The system can be used as a substitute for or as a supplement to conventional friction bakes.

22 Claims, 3 Drawing Sheets

U.S. PATENT DOCUMENTS

| | | | |
|---|---|---|---|
| 6,633,143 B2* | 10/2003 | Weston et al. | 318/34 |
| 2001/0003805 A1* | 6/2001 | Koibuchi | 701/9 |
| 2001/0011050 A1* | 8/2001 | Yamaguchi et al. | 477/3 |
| 2001/0037793 A1* | 11/2001 | Robichaux et al. | 123/339.19 |
| 2002/0112902 A1* | 8/2002 | Wakashiro et al. | 180/65.2 |
| 2002/0112903 A1* | 8/2002 | Wakashiro et al. | 180/65.2 |
| 2002/0116101 A1* | 8/2002 | Hashiba et al. | 701/22 |
| 2002/0163251 A1* | 11/2002 | Crombez et al. | 303/152 |
| 2002/0171383 A1* | 11/2002 | Hisada et al. | 318/432 |
| 2002/0179047 A1* | 12/2002 | Hoang et al. | 123/350 |
| 2003/0006076 A1* | 1/2003 | Tamor | 180/65.2 |
| 2003/0098185 A1* | 5/2003 | Komeda et al. | 180/65.2 |

* cited by examiner

METHOD AND APPARATUS FOR BRAKING AND STOPPING VEHICLES HAVING AN ELECTRIC DRIVE

This is a Divisional of application Ser. No. 10/927,195 filed on Aug. 25, 2004.

FIELD OF THE INVENTION

This invention generally relates to vehicles with electric drive systems, and deals more particularly with a method and apparatus for braking and stopping the vehicle using the electric drive.

BACKGROUND OF THE INVENTION

Many recent designs of electric powered and hybrid electric powered vehicles employ a regenerative braking system in order to increase operating efficiency. During a braking event, the electric motor which normally drives one or more traction wheels is switched to operate as an electrical generator. Using the momentum and kinetic energy of the vehicle, the electric drive motor generates electricity that may be used to recharge on-board energy storage systems, such as batteries and ultra capacitors, power accessories, or power auxiliary on-board systems.

Regenerative braking systems are particularly effective in recovering energy during city driving, where driving patterns of repeated acceleration and decelerations are common. Electric drive vehicles employing regenerate braking typically utilize traditional friction brakes, along with a vehicle control system that coordinates the operation of the friction brakes and the regenerative brake in order to provide adequate stopping ability while making dual brake operations essentially transparent to the driver. Normally, such a control system controls the electric motor torque to perform regenerative braking until the vehicle decelerates to a certain speed at which time the friction brakes are gradually applied to bring the vehicle to a compete stop.

The dual braking strategy described above may not be optimum for certain types of electric drive configurations, and may not be appropriate for configurations where it is desirable to completely avoid friction braking components. For example, a two axle vehicle might be provided with friction brakes on the wheels of only one axle; clearly it would be desirable to provide an electric means of fully braking the axle not equipped with friction brakes. In some configurations, it may be desirable to completely avoid the use of friction brakes, thus necessitating the use of some electronic means of achieving adequate braking. Even in those configurations where all wheels are equipped with friction brakes, it may be desirable to provide frictionless electric braking for each axle in the event that the friction brakes are intentionally or unintentionally disabled for any reason.

Accordingly, a need exists in the art for a braking system for vehicles with electric drive systems capable of providing frictionless deceleration and braking of the vehicle to all speeds down to and including zero speed, regardless of the configuration of the vehicle's motor drive, axles and wheels. The present invention is intended to satisfy this need.

SUMMARY OF THE INVENTION

A system is provided for decelerating and stopping a vehicle equipped with an electric drive system without the need for friction brakes, or with reduced need for friction brakes on at least one wheel. Braking deceleration of the vehicle is achieved by controlling the electric drive motor to produce negative torque which is transmitted to the wheels, enabling deceleration down to and including zero speed. To maintain the stopping position of the vehicle on grade inclines, the electric drive motor is controlled to produce a small, compensating amount of positive or negative torque at zero speed, depending on the direction of the incline. The system may also be used as a back-up braking system for vehicles equipped with friction brakes, or to provide supplemental braking on axle assemblies that are not equipped with friction brakes.

One advantage of the invention is that the braking system can be used with reduced need for conventional friction brakes. Another advantage lies in the ability of the present braking system to decelerate the vehicle down to and including zero speed, and maintain the vehicle at a complete stop under various driving conditions, such as on a grade, using the speed control loop of the electric drive. A still further advantage of the invention is that the need for conventional friction brakes may be completely avoided.

In accordance with a first embodiment of the invention, a method is provided for braking and stopping a vehicle having at least one traction wheel driven by an electric motor. Braking and stopping is achieved by sensing a speed parameter related to the speed of the vehicle, sensing a commanded braking rate, generating a motor control signal using the sensed speed parameter and commanded braking rate, producing a negative torque using the electrical drive motor, applying braking forces to the traction wheels using the negative torque, and controlling the amount of negative torque produced by the electric drive motor using the motor control signal to achieve the commanded braking rate. The motor control signal may include a torque command signal, a speed command signal or a combination of these two signals. The torque command signal can be used to control the motor until the vehicle decelerates to a pre-selected speed, following which a speed control signal is used for motor control. The motor control signal is based on torque commands determined by the position of the vehicle's brake and accelerator pedals. The sensed speed parameter may include either the speed of the drive motor, the speed of at least one wheel of the vehicle, or a combination of these sensed speeds.

In accordance with a second embodiment of the invention, a system is provided for braking and stopping a vehicle powered by an electric motor driving at least one traction wheel. The system includes a closed loop speed control loop whose speed command is a zero speed signal. This closed loop system features modification of its control signal (torque command signal for the electric drive) by a bipolar torque limit signal-pair. The limit signal-pair is directly derived from a torque command that is obtained by the vehicle system controller, with the accelerator and brake pedals as inputs. The torque command of the vehicle system controller may be used for driving and deceleration at higher speeds, but the torque-limited speed control loop is used for bringing the vehicle to a stop.

These non-limiting features, as well as other advantages of the present invention may be better understood by considering the following details of a description of a preferred embodiment of the present invention. In the course of this description, reference will frequently be made to the attached drawings.

DETAILED DESCRIPTION OF THE PREFERRED EMBODIMENT

Figure 1:
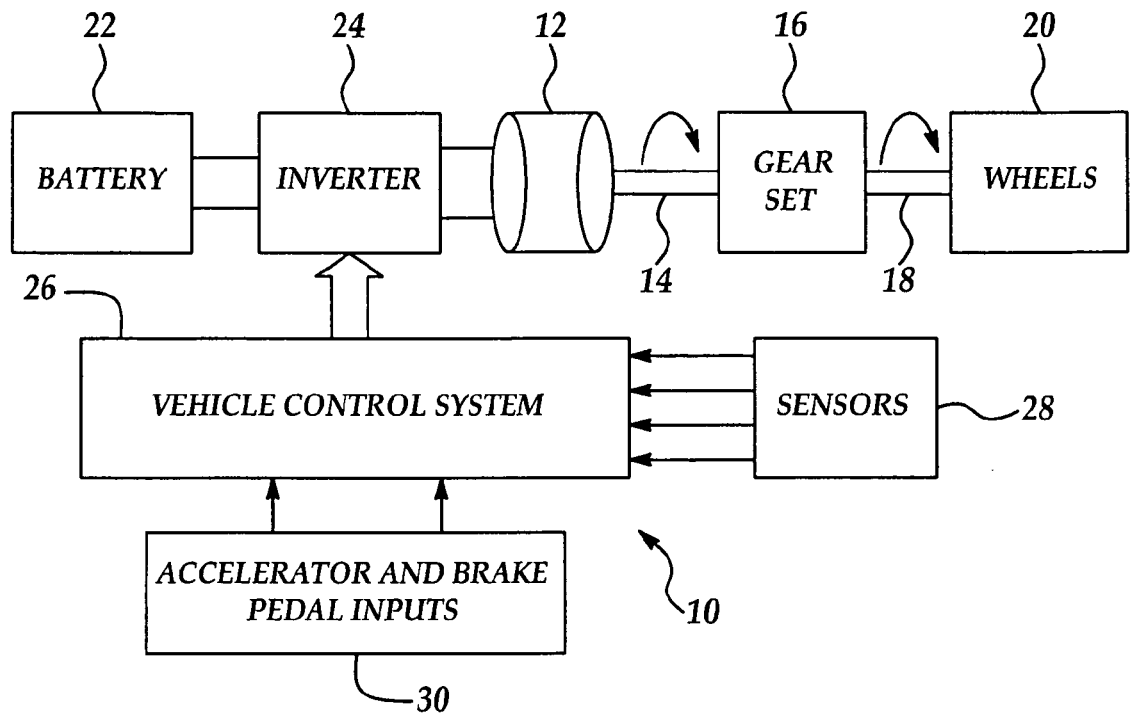
FIG. 1 is an exemplary block diagram of an electric drive system for a vehicle.

The invention relates to a method and apparatus for decelerating, braking and stopping a vehicle equipped with an electric drive system which includes an electric motor. A typical electric drive system 10 is shown in FIG. 1. An electric motor 12 mounted on the vehicle's chassis has an output drive shaft 14 which is connected through a differential gear-set 16 to a drive axle 18 carrying one or more traction wheels 20. Energy for powering the motor 12 is derived from an on-board storage battery 22 which provides DC power that is converted by an inverter 24 into AC power used to drive the motor 12. Although an AC motor 12 has been disclosed here, it should be noted that the present invention is suitable for use with a variety of DC and poly-phased AC motors. A vehicle control system 26 coordinates and controls the operation of the energy storage and drive components, and manages system functions such as charging, engine starting and stopping and regenerative braking. The vehicle control system 26 may implement any of a variety of known control strategies, using software programs and input information derived from a variety of on-board sensors 28, as well as accelerator pedal and brake pedal position information 30. It should be noted here that although a drive system 10 has been shown employing only a single motor 12, the present invention may be used in drive systems employing multiple electric motors, alternate fuel sources and hybrid configurations employing at least one drive electric motor. Furthermore, the motor 12 may be in the form of a wheel motor that is incorporated directly into one or more wheels on the vehicle. For sake of convenience in the describing and claiming the invention, "negative torque" applied to a drive wheel shall mean a torque that opposes the motion of the vehicle, whereas a positive torque applied to the wheel shall mean a torque that favors the vehicle's motion.

The vehicle control system 26 may deliver either a torque command or a speed command to the motor 12, having a polarity and magnitude that is based on the positions of the accelerator pedal and the brake pedal 30. The torque command can be either positive or negative in both drive and reverse "gear" selected as the desired direction of travel; as is known in the art, a positive command results in traction torque while a negative command results in braking or deceleration torque. The details of generating both torque and speed commands as a function of pedal positions depend on the particular vehicle configuration and will be based on any of various control strategies which are well known in the art. A torque or speed command developed by the control system 26 is delivered to the inverter 24, causing the motor 12 to produce positive torque which is delivered by a driven axle 18 to traction wheels 20. Based on the position of the accelerator and brake pedals 30, the control system 26 switches the motor 12 to its regenerative mode in which the motor 12 acts as an electrical generator, converting the vehicle's kinetic energy into electrical energy used to recharge the battery 22. During regenerative braking, motor 12 produces a negative torque.

Figure 2:
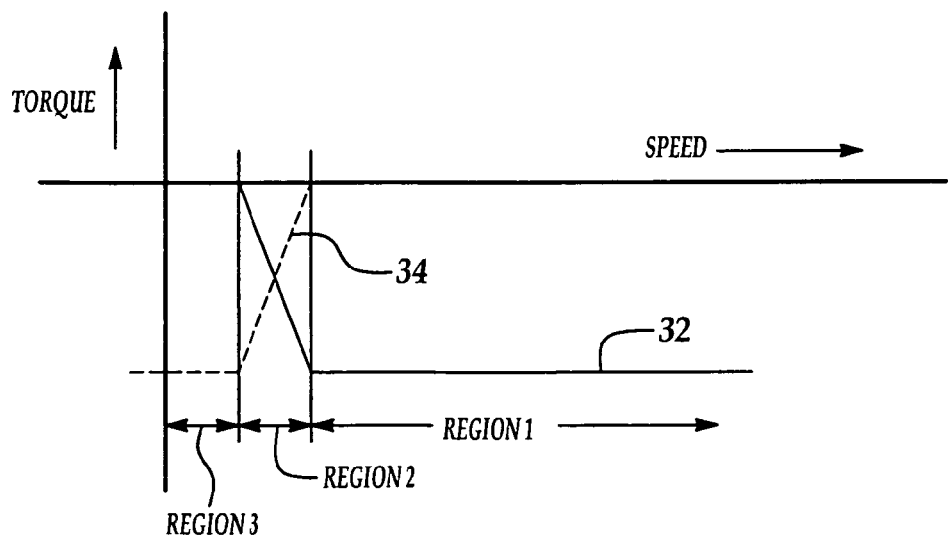
FIG. 2 is a graph showing the brake torque as a function of speed, produced in a vehicle equipped with the combination of electric and friction braking systems.

The relationship between the negative torque produced by motor 12 and that produced by the vehicle's friction brakes is better understood by reference to FIG. 2 which plots torque of the motor 12 as well as friction brake torque as a function of vehicle speed. The plot of FIG. 2 corresponds to a typical vehicle that employs friction brakes on at least one wheel, in addition to regenerative braking provided by at least one electric drive motor on the vehicle. Different modes of braking torque occur over three distinct regions respectively designated as Region 1, Region 2 and Region 3. At higher vehicle speeds shown in Region 1, regenerative braking results in an electric drive torque command 32 which continues until the vehicle brakes to a speed at which friction brakes are applied to produce friction brake torque 34 at the beginning of Region 2. As the friction brake torque 34 increases, the electric drive torque command 32 ramps down until Region 3 is reached where the braking torque is entirely the result of the friction brakes. In Region 3, friction brake torque 34 reaches a constant value and the electric drive torque produced by the torque command 32 is zero.

In accordance with the present invention, deceleration of the vehicle down to and including zero speed (a complete stop) is accomplished using negative torque produced by the motor 12, without the use of braking torque supplied by friction brakes.

Figure 3:
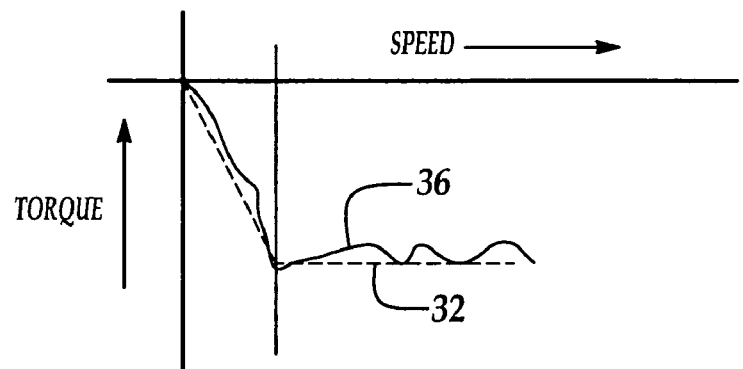
FIG. 3 is a graph showing commanded torque and actual electric drive braking torque as a function of speed, in a vehicle equipped with the electric braking system, according to one embodiment of the present invention.

In accordance with one technique of the present invention, the vehicle control system 26 delivers signals to the motor 12 commanding negative torque 32 as shown in FIG. 3, down to a pre-selected speed where the negative torque is then ramped down to zero. The actual electric drive torque produced by the commanded torque signal 32 is designated by the numeral 36 and can be seen to closely follow the commanded torque curve 32. Thus, using this first technique, only torque control is used for decelerating and stopping the vehicle. This technique is suitable for vehicle operation on essentially level ground. If there is change in ground elevation or grade resulting in an upward slope or downward slope there could be some movement of the vehicle after coming to a near stop. Thereafter, the system will react to the vehicle's speed and effect deceleration but perfect holding at zero speed may not be achieved with this technique if material ground (elevation or grade) slope is present. Accordingly, it may be necessary in using this technique to apply the vehicle's parking brakes, either manually or automatically through the electronic controls, in order to assure that the vehicle is held in a stationary position.

Figure 4:
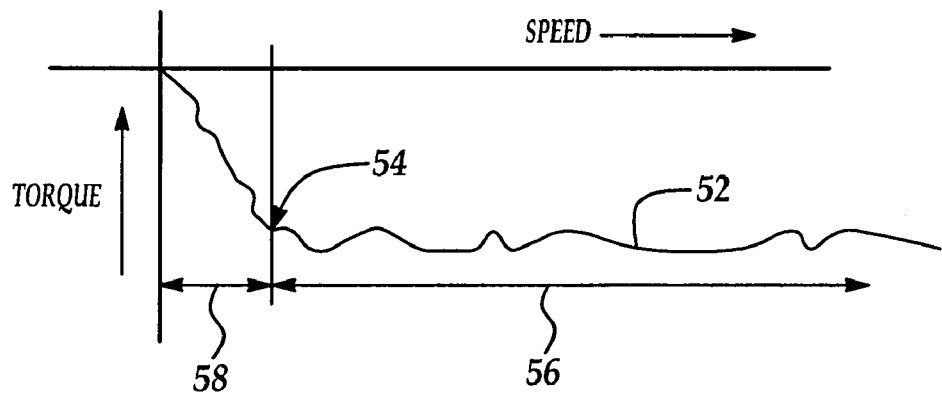
FIG. 4 is a graph of the actual electric drive brake torque as a function of speed generated in accordance with another embodiment of the present invention.

In accordance with another technique, the motor 12 is used to produce negative torque down to a pre-selected speed using the torque control mode previously described, following which motor 12 is switched to speed control mode in which the speed command is zero or another command determined by the accelerator and brake pedal position inputs 30. FIG. 4 is a graph of torque versus speed, which illustrates the second technique more clearly. As can be seen at higher speeds, using the torque control mode 56, the electric drive actual torque 52 is relatively constant down to a pre-selected speed where the control scheme is switched over to speed control mode 58. Speed control results in the actual drive torque 52 ramping down from a corner point 54 to zero speed where the vehicle reaches a full stop. This technique provides adequate position holding when the vehicle stops on a (ground elevation/grade change) material grade slope, since at near zero speed, a speed control loop used to implement the technique generates enough torque to compensate for the slope.

Figure 5:
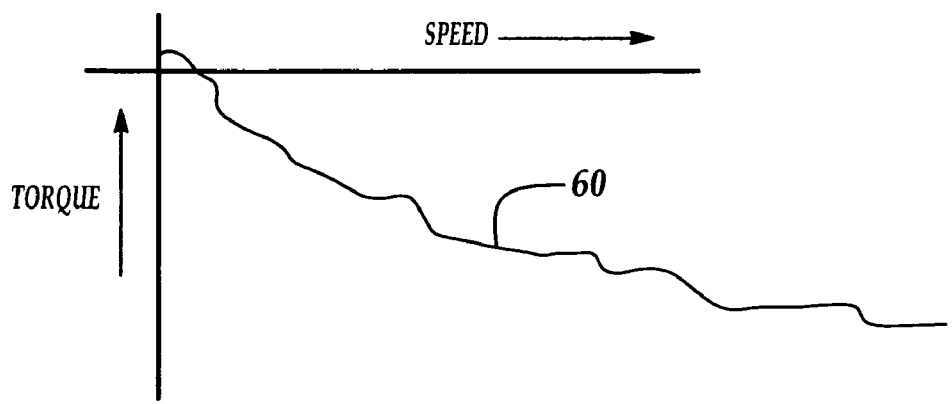
FIG. 5 is a graph showing actual electric drive brake torque as a function of speed, produced according to a further embodiment of the present invention.

If desired, the motor 12 can be operated in a speed control mode throughout the deceleration and stopping procedure using a zero speed command or other speed command that is based on the position of the pedals 30. FIG. 5 is a graph showing the actual electric drive torque 60 during the deceleration and stopping procedure performed using only the speed control mode of operation. It can be seen that the plot of the actual negative torque 60 is more gradual in the reduction of torque as speed decreases. Moreover, it can be seen that the actual torque 60 becomes slightly positive at zero speed. This slightly positive torque at zero speed corresponds to a situation where the vehicle is on a slightly positive or upward grade incline. The slight amount of residual positive torque maintains the vehicle in its stopped position, and compensates for the incline. Similarly, if the vehicle comes to rest on a downward grade incline, a small amount of negative torque is applied at zero speed in order to maintain the position of the vehicle on the incline.

In some applications and vehicle configurations it may not be convenient to translate accelerator and brake pedal inputs 30 into a speed command. In order to address this possibility, a further technique is provided in accordance with the present invention which is illustrated in the block diagram of FIG. 6. Accelerator and brake pedal positions 62, 64 are translated into torque commands by a torque command generator 66; these torque commands may be either negative or positive, depending upon the vehicle's operating conditions. The torque commands are translated into a bi-polar signal (two states—state 1 or state 2) by a bi-polar signal generator 68 which is used as a bi-polar torque limiter, with either positive or negative limit values 70, 72, to further control the torque command signal 74 that is used to control the electric drive 10.

Figure 6:
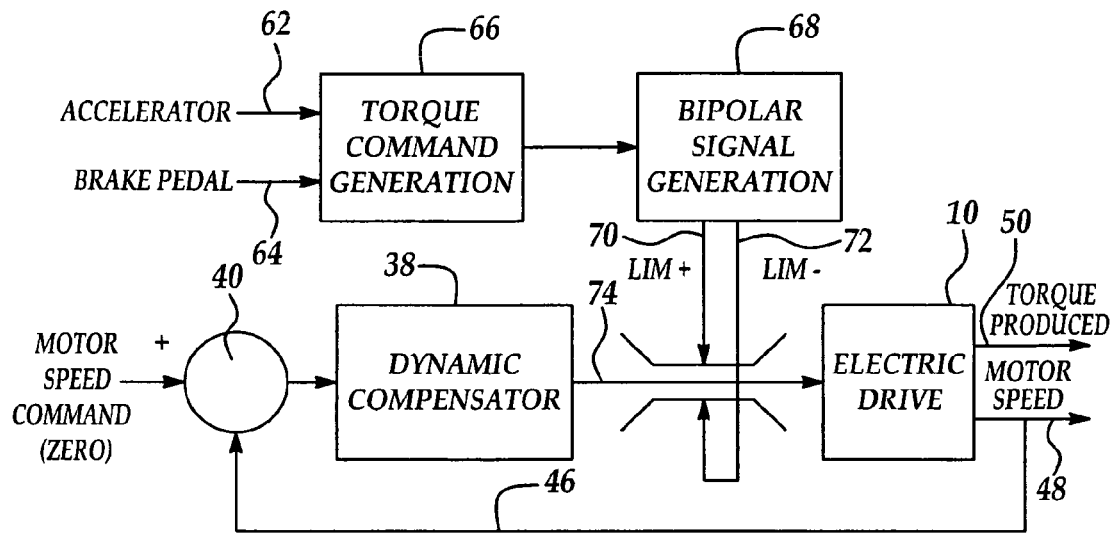
FIG. 6 is a block diagram of a system for braking and stopping an electric drive vehicle, which includes torque limiting with bipolar signals and a speed control loop, in accordance with the present invention.

The speed control loop includes a dynamic compensator 38 which outputs a torque command signal 74 to the electric drive 10 after being subjected to limits 70, 72. The electric drive produces a torque 50 and motor speed 48. The motor speed 48 is fed back in a feedback loop 46 where it is compared at 40 with the motor speed command (normally zero speed) and the error information is fed to the dynamic compensator 38. The output of the dynamic compensator 38 is the torque command signal 74 which is subjected to the limits 70, 72 and hence may become limited. The resulting torque command signal is the final torque command signal for the electric drive 10. One function of the speed control loop is to generate electric drive torque command whose function is to reduce the speed of the motor 12 to zero by closed loop control action. As previously noted, due to the action of the speed control loop, the torque at zero and near zero speeds will be positive (corresponding to the traction) if there is a grade opposing the forward motion of the vehicle, and it will be negative if there is a grade favoring the forward motion of the vehicle. As can be seen in FIG. 6, the torque control loop is nested within the speed control loop with the motor speed 48 being fed back in loop 46 to be combined with the commanded motor speed. The commanded motor speed is the desired vehicle speed multiplied by an appropriate gear ratio related to the gear-set 16 (FIG. 1). The initial condition of the dynamic compensator 38 should be set to the value of the torque command value existing at the moment preceding the transition from torque control to speed control. It should be noted here that if the brake pedal is not depressed a sufficient amount, the torque limiting which is imposed will be small in magnitude and the electric drive torque produced may not be sufficient to obtain zero motor speed and vehicle speed. In this case, the vehicle operator will depress the brake pedal a further amount in order to obtain zero speed. In a similar manner, if the vehicle is being brought to a stop on a steep slope, the operator may need to depress the brake sufficiently and, possibly fully, in order to achieve and/or maintain a complete vehicle stop. When the torque command as output by the pedal interpreter changes sign, the speed control loop is exited. It should be appreciated here that if the driver does not depress the brake sufficiently and the above described torque limiting function is not employed, the vehicle can be held on a grade solely through the use of the speed control function. In other words, if the torque command signal 74 of the closed loop system of FIG. 6 is not subjected to the limits 70, 72, then the system would be able to achieve and maintain zero speed on a grade even though the brake is not depressed sufficiently.

It should be further noted that in each of the control techniques described above, regeneration cannot take place at low speeds, even though the sign of the electric drive torque is negative. Due to certain fixed losses in the drive system, the battery will be supplying power at speeds near zero, even though the generated torque is negative. Moreover, due to the action of the speed control loop, the torque at zero and near zero speeds will be positive (corresponding to traction) if there is a grade opposing the forward motion of the vehicle, and it will be negative if there is a grade favoring the forward motion of the vehicle.

Figure 7:
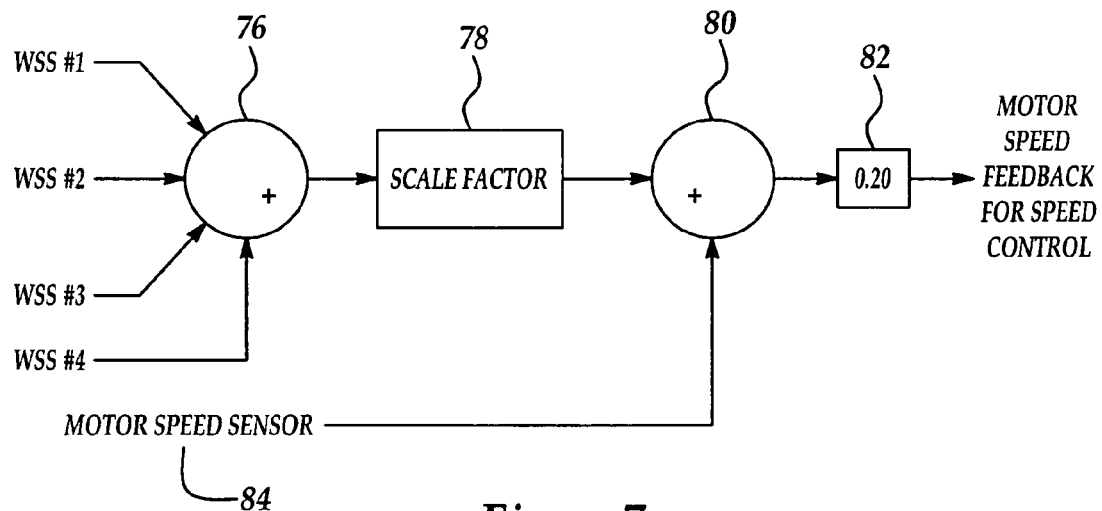
FIG. 7 is a block diagram of a system for obtaining averaged motor speed.

Depending upon the vehicle and electric drive configuration, some small inaccuracies of the motor speed signal may occur at vehicle speeds near zero. This may be caused in part by noise and quantization effects due to the operation of motor speed encoders. Thus, it may be desirable to improve the motor speed detection in certain applications, and in this connection a technique is shown in FIG. 7 for improving speed detection accuracy. A plurality of wheel speed sensors, WSS#1-WSS#4 are used in combination with a motor speed sensor 84 to arrive at a speed signal used for the control process. The wheel speed sensor information is combined and averaged at 76 and multiplied by a scale factor at 78 which is related to the gear ratio between the motor 12 and wheels 20. The averaged and scaled wheel speed information is added to the motor speed 84 at 80 and then multiplied by a factor of ⅕ at block 82. The resulting motor speed value having superior accuracy is used at the feedback signal and loop 46 (FIG. 6).

Figure 8:
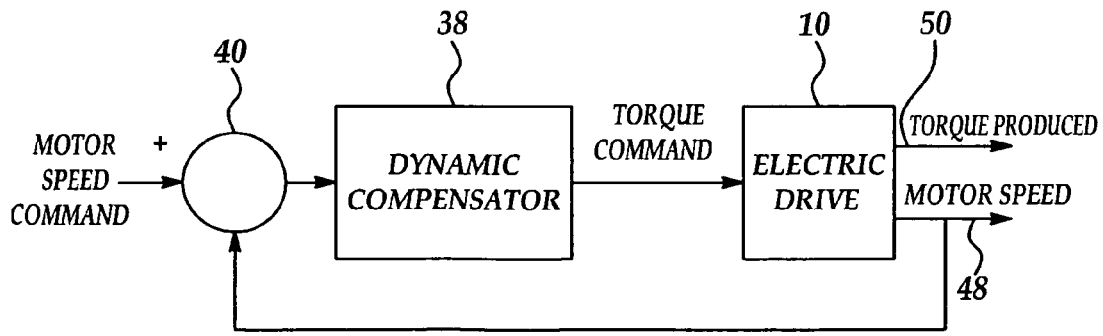
FIG. 8 is a block diagram of a speed control loop having a nested torque control system, used in the present invention.

FIG. 8 shows a simplified speed control loop with nested torque control system. In this embodiment, the torque control loop is a loop within the speed control loop, and the motor speed is measured and used as the feedback signal. Commanded motor speed is the desired vehicle speed multiplied by the appropriate gear ratio. The same scheme given above and shown in FIG. 7 can be used for obtaining motor speed in those embodiments of the invention wherein the speed control loop shown in FIG. 8 is used.

From the foregoing description it is apparent that a novel method is provided of braking and stopping a vehicle having at least one traction wheel. The method includes the steps of sensing a speed parameter related to the speed of the vehicle, sensing a commanded brake rate, generating a motor control signal using the sensed speed parameter and commanded braking rate, producing a negative torque using the electric motor, applying a braking force to the traction wheel using the negative torque, and controlling the amount of negative torque produced by the electric motor using the motor control, signals to achieve the commanded braking rate. The motor control signal may be a power command signal or a force command signal.

It is to be understood that the specific methods and techniques which have been described are merely illustrative of one application of the principles of the invention. For example, if the motor torque capability is limited, the present method can be utilized in combination with friction brakes that may or may not be downsized. Moreover, the present invention does not require the elimination of friction brakes on at least one wheel. Numerous modifications may be made to the method and system as described without departing from the true spirit and scope of the invention.

What is claimed is:

1. A system for braking and stopping a vehicle powered by an electric motor driving at least one traction wheel, comprising:
    a torque command signal generator adapted to generate a first torque command signal based on brake pedal and accelerator pedal position values, said torque command signal comprising a positive torque to drive the motor or a negative torque to brake the traction wheel, said torque command signal adapted to control a motor speed at or above a first vehicle speed;
    a torque limiting signal generator adapted to convert said first torque command signal into torque limiting signals, said torque limiting signals limiting at least a second torque command signal produced within a speed control loop, said speed control loop adapted to output said at least a second torque command signal to said motor to control said motor speed to approach a commanded motor speed including zero motor speed, said zero motor speed achieved and maintained without application of friction using only said speed control loop, said speed control loop adapted to control said motor speed below said first vehicle speed.

2. The system of claim 1, wherein the speed control loop comprises a dynamic compensator adapted to output at least a third torque command signal to said motor based on an error determined between said commanded motor speed and a determined motor speed following outputting said at least a second torque command signal.

3. The system of claim 1, wherein the speed control loop comprises a closed speed control loop.

4. The system of claim 1, wherein the torque limiting signal generator comprises a bipolar signal generator.

5. The system of claim 1, wherein the speed control loop comprises a dynamic compensator adapted to output said at least a second torque command signal based on an initial torque value.

6. The system of claim 5 wherein said initial torque value is a torque value immediately preceding a transition from solely torque control of said motor to speed control of said motor, said speed control comprising operation of said speed control loop.

7. The system of claim 1 wherein said speed control loop is operable upon a transition from solely torque control of said motor to solely speed control of said motor, said speed control comprising operation of said speed control loop.

8. The system of claim 1 wherein said speed control loop is adapted to operate to accomplish deceleration and stopping of said vehicle using only said speed control loop.

9. The system of claim 1 wherein said speed control loop is adapted to be exited upon a change of said first torque command signal from positive to negative or negative to positive.

10. The system of claim 1, wherein said speed control loop is adapted to produce positive torque at zero motor speed levels in the case of a grade opposing forward motion of said vehicle.

11. The system of claim 1, wherein said speed control loop is adapted to produce negative torque at zero motor speed levels in the case of a grade favoring forward motion of said vehicle.

12. The system of claim 1, further comprising a motor speed encoder and wheel sensors adapted in combination to determine said motor speed.

13. The system of claim 1, wherein said speed control loop is further adapted to receive a determined motor speed following outputting of said at least a second torque command signal to said motor, wherein said determined motor speed is compared to said commanded motor speed to determine and output at least a third torque command signal to said motor.

14. A system for braking and stopping a vehicle powered by an electric motor driving at least one traction wheel, comprising:
    a torque command signal generator adapted to generate a first torque command signal based on brake pedal and accelerator pedal position values, said torque command signal comprising a positive torque to drive the motor or a negative torque to brake the traction wheel said torque command signal adapted to control a motor speed at or above a first vehicle speed;
    a torque limiting signal generator adapted to convert said first torque command signal into torque limiting signals, said torque limiting signals limiting at least a second torque command signal produced within a speed control loop, said speed control loop adapted to output said at least a second torque command signal to said motor and receive a subsequently determined motor speed, wherein said determined motor speed is compared to a commanded motor speed to produce and output at least a third torque command signal to said motor to approach said commanded motor speed including zero motor speed, said zero motor speed achieved and maintained without application of friction using only said speed control loop, said speed control loop adapted to control said motor speed below said first vehicle speed.

15. The system of claim 14, wherein the speed control loop comprises a dynamic compensator adapted to output said at least a third torque command signal based on an error determined between said commanded motor speed and said determined motor speed.

16. The system of claim 14 wherein said speed control loop is adapted to be exited upon a change of said first torque command signal from positive to negative or negative to positive.

17. The system of claim 14, wherein said speed control loop is adapted to produce positive torque at zero motor speed levels in the case of a grade opposing forward motion of said vehicle and to produce negative torque at zero motor speed levels in the case of a grade favoring forward motion of said vehicle.

18. The system of claim 14, further comprising a motor speed encoder and wheel sensors adapted in combination to determine said determined motor speed.

19. The system of claim 14, wherein said at least a second torque command signal comprises an initial torque value having a torque value immediately preceding a transition from solely torque control of said motor to speed control of said motor, said speed control comprising operation of said speed control loop.

20. A system for braking and stopping a vehicle powered by an electric motor driving at least one traction wheel, comprising:
- a torque command signal generator adapted to generate a first torque command signal based on brake pedal and accelerator pedal position values, said torque command signal comprising a positive torque to drive the motor or a negative torque to brake the traction wheel, said torque command signal adapted to control a motor speed at or above a first vehicle speed;
- a torque limiting signal generator adapted to convert said first torque command signal into torque limiting signals, said torque limiting signals limiting at least a second torque command signal produced within a speed control loop, said speed control loop adapted to output said at least a second torque command signal to said motor and receive a subsequently determined motor speed, wherein said determined motor speed is compared to a commanded motor speed to produce and output at least a third torque command signal to said motor to approach said commanded motor speed;
- wherein said speed control loop is adapted to operate to accomplish deceleration and stopping of said vehicle using only said speed control loop below said first vehicle speed.

21. The system of claim 20, wherein the speed control loop comprises a dynamic compensator adapted to output said at least a third torque command signal based on an error determined between said commanded motor speed and said determined motor speed.

22. The system of claim 20, wherein said speed control loop is adapted to produce positive torque at zero motor speed levels in the case of a grade opposing forward motion of said vehicle and to produce negative torque at zero motor speed levels in the case of a grade favoring forward motion of said vehicle.

* * * * *